Patented July 11, 1950

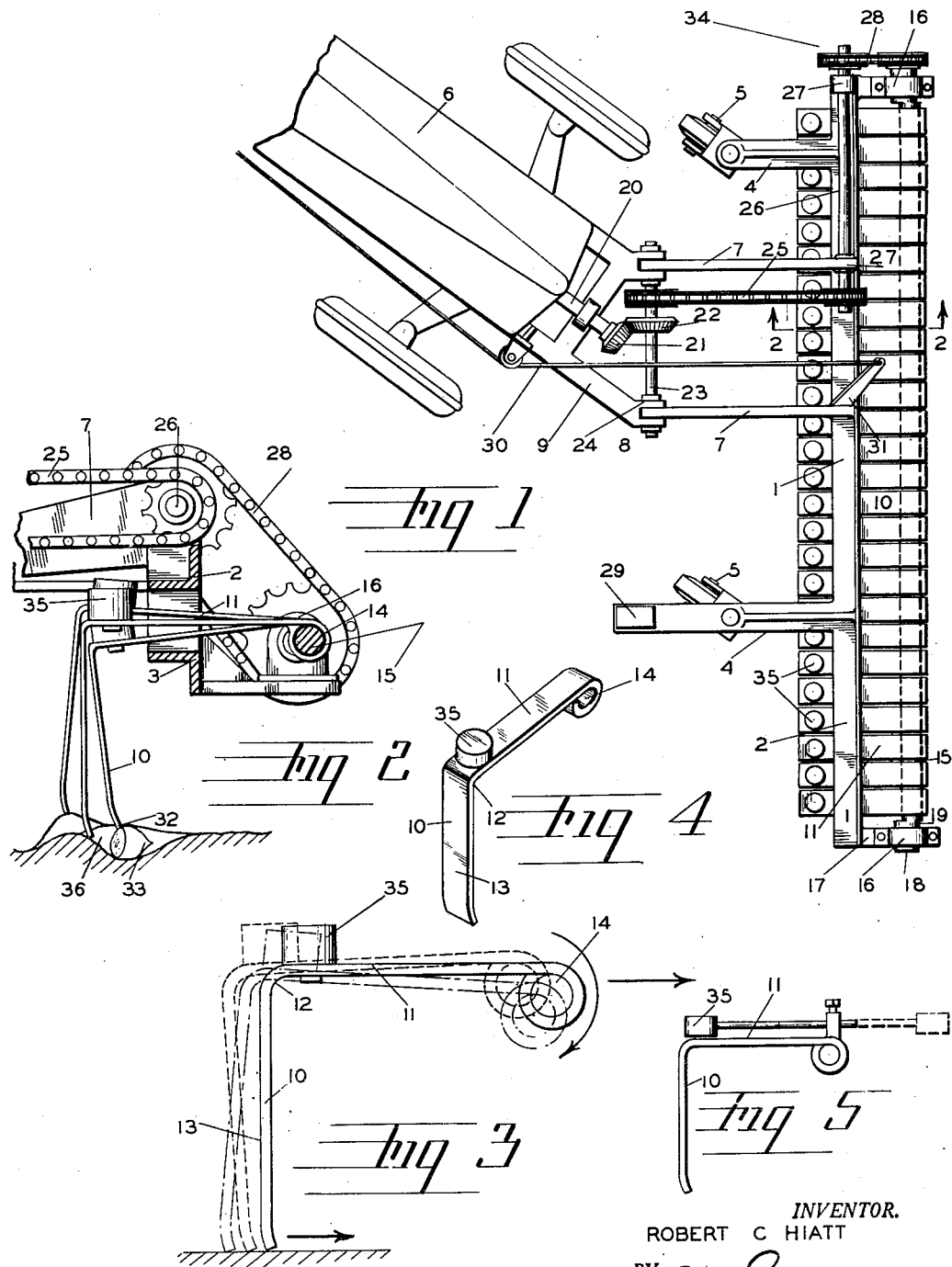

2,514,699

UNITED STATES PATENT OFFICE 2,514,699

RAKE

Robert C. Hiatt, Hillsboro, Oreg.

Application September 18, 1948, Serial No. 49,889

2 Claims. (Cl. 56—27)

My invention relates to rakes and is particularly related to power driven rakes and is admirably adapted for the raking of nuts and the like over the ground surface into windrows.

In the raking of nuts and the like, the ground is usually uneven therefore I have designed a power operated rake whose individual teeth will follow the contour of the surface of the ground raking the nuts over the surface of the ground even though they may be located in a hollow or pocket of the ground surface.

The nuts are all raked into windrows by mounting the rake at an angle to the direction of travel, all of the individual teeth being agitated by power means moving the nuts along the rake into the said windrows.

The primary object of my invention is to provide a rake whose teeth operate independently from one another over the ground surface, the teeth being oscillated in such a manner as to move nuts or other objects along in front of the teeth at an angle to the direction of travel so that these objects will be caused to move to one end of the rake into windrows, or into a machine that will pick them off the ground surface.

A further object of my invention is to provide a rake that can be mounted to a tractor for raking objects from the ground surfaces into windrows.

I have adapted my new and improved rake to the raking of filberts, almonds and the like, the same being mounted to a nut cleaning and sacking machine which I have applied for patent in a separate application, Serial Number 786,402. In this application I have used a rotary brush instead of my new improved rake.

These and other incidental objects will be apparent in the drawings, specification and claims.

Referring to the drawings:

Figure 1 is a plan view of my new and improved rake mounted to a conventional tractor.

Figure 2 is a sectional view taken on line 2—2 of Figure 1.

Figure 3 is a diagrammatical layout of the movement of the teeth of the rake relative to the ground surface.

Figure 4 is a perspective view of one of the fingers or tines of my new and improved rake.

Figure 5 illustrates a preferred form of counterbalancing the fingers or tines.

Referring more specifically to the drawings:

My new and improved rake consists of a frame 1, consisting of an upper rail 2 and a lower rail 3. This frame has rearwardly extending frame members 4, which are mounted upon the caster wheels 5, the said wheels supporting the main frame 1.

The frame 1 and the rake assembly are connected to the tractor 6 by way of the rearwardly extending arms 7, which are secured and form part of the frame 1, best illustrated in Figures 1 and 2. The opposite end of the arms 7 are pivotally connected at 8 to the special frame 9 extending forward of the tractor.

My new and improved rake further consists of fingers or tines 10 which are illustrated in perspective in Figure 4. They consist of a horizontal portion 11 being bent at right angles at 12 and extending downwardly in a vertical member 13. A bearing 14 is formed in the horizontal portion 11 and is adapted to be journalled to the cross shaft 15. The shaft 15 is journalled within pillow blocks 16, which are fixedly mounted to the frame 1 at 17. The shaft 15 has its central and major portion offset from its bearing spindles 18, as indicated by numeral 19, the bearing spindles 18 are mounted within the pillow blocks 16 as best illustrated in Figure 1. This provides a throw and causes the fingers 10 to take the various positions as indicated in Figure 3 when the shaft 15 is rotated.

The shaft 15 is rotated about the power take off shaft 20, gears 21 and 22, the gear 22 being keyed to the cross shaft 23 which is journalled within suitable bearings as at 24. A chain 25 is driven from the shaft 23 and drives a counter-shaft 26 journalled within the bearings 27 forming part of the frame 1. The countershaft drives the cross eccentric shaft 15 by way of the drive chain 28. It will be noted that the rake assembly is mounted at an angle to the direction of travel of the tractor, the object of which will be apparent in the following description of the operation of my new and improved rake.

As the tractor moves forward the rake assembly is also moved forward, the weight of which is supported on the caster wheels 5. The weight of the frame 1 and the time assembly is partially counterbalanced by the weight 29 extending beyond the wheels 5, as shown in Figure 1. The whole rake assembly may be raised through the action of the cable 30 being secured to the upwardly extending lever 31 forming part of the frame 1 pivoting the arms 7 about the pivot connections 8.

As the tractor moves forward and the power take off 20 rotates the gears 21, 22, shaft 23, chain 25, countershaft 26, chain 28 and the eccentric shaft 15, the tips 32 of the tines 10 will be moved back and forth over the ground surface at a relatively high rate of speed kicking the nuts 33, as indicated in Figure 2, along in front of the tips 32 of the tines. Due to the fact that the rake assembly is mounted to the tractor at an angle to the direction of travel, the nuts or objects being raked will travel towards the end being deposited in windrows, or in the case of a machine like a sorting and sacking machine, they would be picked up by this machine from the end 34 on being delivered to the said end.

A weight 35 is mounted to each of the tines and exerts a downward pressure so that the ends 32 of the tines will drop into the depressions existing on the ground surface, picking up the objects therefrom and forcing them forward.

In Figure 5 I illustrate a modified form of the weight assembly, one that can be reversed or adjusted relative to the tines or fingers 10. By providing an adjustment for the weight, the rake can be adapted to various types of raking operations, which is important in my new and improved rake design.

In Figure 2 I have illustrated the tines having their tips at various elevations. I have found that by having all of the tines working in synchronism with one another on the eccentric shaft 15 that they work effectively and a simple oscillating mechanism is provided where the end shaft is off center. In Figure 3 I illustrate the position of the tines relative to different positions of the eccentric shaft.

As stated above, as the machine moves forward the tips 32 of the tines 10 keep moving forward and backward forcing the nuts or objects forward of the tips and due to the angular connection relative to the direction of travel they will be forced not only forward but sidewise against the width of the rake into windrows.

Although certain specific embodiments of the invention have been shown and described, it is obvious that many modifications thereof are possible. The invention, therefore, is not to be restricted except in so far as is necessitated by the prior art and by the spirit of the appended claims.

What I claim is:

1. A rake comprising a frame, a shaft mounted on the frame, said shaft having a continuous excentric portion between its two ends, a series of tines loosely mounted on the continuous excentric portion of the shaft, each tine comprising a horizontal portion formed at its free end with a bearing to receive the excentric portion of the shaft and a substantially vertical portion depending from the horizontal portion, whereby in the rotation of the shaft the lower ends of the substantially vertical portions of the tines will follow the irregularities of the surface of the ground.

2. A rake as defined in claim 1 wherein a weight is mounted on the horizontal portion of the tines substantially over the substantially vertical portion to assist the ends of the tines to follow the irregularities of the ground.

ROBERT C. HIATT.

REFERENCES CITED

The following references are of record in the file of this patent:

UNITED STATES PATENTS

| Number | Name | Date |
| --- | --- | --- |
| 492,341 | Spangler | Feb. 21, 1893 |
| 1,905,409 | Innes | Apr. 25, 1933 |
| 1,907,467 | Tervo et al. | May 9, 1933 |
| 1,944,750 | Lindgren et al. | Jan. 23, 1934 |
| 2,296,065 | Slamp | Sept. 15, 1942 |
| 2,355,273 | Case | Aug. 8, 1944 |
| 2,459,471 | Tebbetts | Jan. 18, 1949 |